(12) United States Patent
Soe-Jensen (10) Patent No.: US 8,316,614 B2
(45) Date of Patent: Nov. 27, 2012

(54) METHOD FOR ESTABLISHING A WIND TURBINE ON A SITE

(75) Inventor: Anders Soe-Jensen, Farum (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/743,734

(22) PCT Filed: Dec. 1, 2008

(86) PCT No.: PCT/DK2008/000425
§ 371 (c)(1),
(2), (4) Date: May 19, 2010

(87) PCT Pub. No.: WO2009/068038
PCT Pub. Date: Jun. 4, 2009

(65) Prior Publication Data
US 2010/0281820 A1 Nov. 11, 2010

(30) Foreign Application Priority Data

Nov. 29, 2007 (DK) ................................ 2007 01708

(51) Int. Cl.
*E04H 12/34* (2006.01)
(52) U.S. Cl. ............... 52/745.17; 416/1; 416/244 R; 416/142; 52/40
(58) Field of Classification Search ........... 52/40, 123.1, 52/745.17, 745.18, 745.04; 290/55, 44; 416/1, 416/119, 142, 224 R, 244 R, DIG. 6
See application file for complete search history.

(56) References Cited

U.S. PATENT DOCUMENTS

| 4,272,929 | A | * | 6/1981 | Hanson ............................ 52/40 |
| 4,311,434 | A | * | 1/1982 | Abe ................................ 416/142 |
| 4,683,832 | A | | 8/1987 | Dysarz |
| 6,408,575 | B1 | * | 6/2002 | Yoshida et al. .................. 52/40 |
| 6,614,125 | B2 | * | 9/2003 | Willis et al. .................... 290/55 |
| 6,782,667 | B2 | * | 8/2004 | Henderson ..................... 52/116 |

(Continued)

FOREIGN PATENT DOCUMENTS
DE 101 01 405 7/2002
(Continued)

OTHER PUBLICATIONS

Lars Kolby; International Search Report issued in a corresponding international application No. PCT/DK2009/000166; Oct. 8, 2010; 3 pages; European Patent Office.

(Continued)

*Primary Examiner* — Robert Canfield
*Assistant Examiner* — Jessie Fonseca
(74) *Attorney, Agent, or Firm* — Wood, Herron & Evans, LLP (57) ABSTRACT

Method for establishing a wind turbine (1) on a foundation (7) where at least a part of the wind turbine rotor (4) is attached to a wind turbine tower (2). Further, the method comprises the steps of positioning the wind turbine tower including the attached wind turbine rotor on the foundation, elevating a wind turbine nacelle (3) to a use position on the tower, and directly or indirectly connecting the nacelle to the attached wind turbine rotor. The invention also relates to transport of a wind turbine tower, and a vessel (10) suitable for transporting a wind turbine tower.

8 Claims, 7 Drawing Sheets

U.S. PATENT DOCUMENTS

| | | | |
|---|---|---|---|
| 6,955,025 B2 * | 10/2005 | Dehlsen et al. | 52/745.17 |
| 7,112,010 B1 | 9/2006 | Geiger | |
| 2005/0286979 A1 | 12/2005 | Watchorn | |
| 2006/0120809 A1 * | 6/2006 | Ingram et al. | 405/195.1 |
| 2006/0175465 A1 * | 8/2006 | Teichert | 244/33 |
| 2007/0243063 A1 * | 10/2007 | Schellstede | 416/10 |
| 2007/0266538 A1 * | 11/2007 | Bervang | 29/428 |

FOREIGN PATENT DOCUMENTS

| | | |
|---|---|---|
| DE | 102 15 915 | 10/2003 |
| DE | 103 21 850 | 12/2004 |
| EP | 0371813 | 6/1990 |
| EP | 1 101 936 | 5/2001 |
| EP | 1 384 883 | 1/2004 |
| EP | 1 634 998 | 3/2006 |
| GB | 2 315 464 | 2/1998 |
| GB | 2 344 843 | 6/2000 |
| GB | 2 407 114 | 4/2005 |
| GB | 2 423 108 | 8/2006 |
| GB | 2 434 823 | 8/2007 |
| JP | 06257555 | 9/1994 |
| NL | 1023142 | 10/2004 |
| NO | 322435 | 7/2006 |
| WO | 99/16695 | 4/1999 |
| WO | 99/43956 | 9/1999 |
| WO | 00/77306 | 12/2000 |
| WO | 03/033342 | 4/2003 |
| WO | 03/055741 | 7/2003 |
| WO | 03/093584 | 11/2003 |
| WO | 03/100178 | 12/2003 |
| WO | 2004/070119 | 8/2004 |
| WO | 2006/080850 | 8/2006 |
| WO | 2007/003919 | 1/2007 |
| WO | 2007/097640 | 8/2007 |

OTHER PUBLICATIONS

Omiros Verheul; International Search Report and Written Opinion issued in related PCT application No. PCT/DK2008/000425; Mar. 3, 2009; 14 pages; European Patent Office.

Unknown; English Translation of Japanese Application Publication No. H6-257555; published Sep. 13, 1994; 7 pages.

Pictures from a positioning of a REpower 5 MW off-shore wind turbine, date uncertain but prior to Apr. 23, 2010, 2 pages.

European Patent Office, Office Action issued in corresponding EP Application No. 08854055.4-1256 dated May 10, 2012, 4 pages.

* cited by examiner

METHOD FOR ESTABLISHING A WIND TURBINE ON A SITE

BACKGROUND OF THE INVENTION

The invention relates to a method for establishing a wind turbine on a site, a wind turbine tower and use hereof.

The size of modern wind turbines is such that erecting the wind turbines often requires highly specialized cranes such as cranes adapted for lifting wind turbine components to heights significantly above ground or sea level.

The number of said cranes is limited and other engagements of the cranes may thus cause a problem of delays and increased costs in the process.

The significance of the problem is increased by the large number of crane lifts to great heights which is included in erecting a modern wind turbine e.g. the crane lifts of the tower segments followed by the crane lifts of the nacelle and rotor blades. The great heights further complicates the lifts by the high requirements to the skills of the crane operators in handling and positioning the wind turbine components e.g. in lifting a wind turbine blade to a mounting position of the wind turbine nacelle/hub without damaging the blade against the wind turbine such as the wind turbine tower.

The object of the invention is to provide technique which simplifies the process of establishing a modern wind turbine.

THE INVENTION

The invention relates to a method for establishing a wind turbine on a site, said method comprising the steps of
attaching at least a part of the wind turbine rotor means to a wind turbine tower by attachment means,
positioning said wind turbine tower including said at least a part of the wind turbine rotor means at the site,
elevating a wind turbine nacelle to a use position on said tower, and
directly or indirectly connecting said nacelle to said at least a part of the wind turbine rotor means.

Hereby is achieved a simplification in the erecting of a wind turbine as the number of lifts is reduced by integration of the wind turbine tower and the rotor means in one lift.

Further simplification of the process is achieved by the link between the tower and the rotor means via the attachment means during the positioning of the tower on the foundation. The link may ensure a better hold on the rotor means and the rotor orientation during the positioning and especially that the rotor means is restrained from damage against the tower.

Even further, the method of establishing a wind turbine is less wind sensitive which is a significant advantage in handling the increasingly heavy wind turbine blades.

The term "directly or indirectly" in relation to the nacelle connection should be understood as a direct connection between the rotor means and the nacelle or an indirect connection via a hub as generally established in modern wind turbine designs.

In aspects of the invention, said wind turbine tower is positioned with a foundation attached, is positioned on a foundation pre-established at the site or the foundation is installed subsequently followed by installation of the tower and other wind turbine parts. Hereby is obtained the freedom to choice between an effective integrated solution and a more simple solution by separate transportation.

In another aspect of the invention, said at least a part of the wind turbine rotor means such as a wind turbine blade is attached to said wind turbine tower at the tower manufacturing plant, at some stage throughout the tower transportation or at the wind turbine site. Hereby is ensured that the attachment of the rotor means is performed in a suitable location e.g. when the tower and the rotor means are positioned horizontally on a ground level in the manufacturing plant, on a pier before shipment or on a ship such as a jack-up ship for erecting offshore wind farms.

In a further aspect of the invention, said at least a part of the wind turbine rotor means is vertically adjusted in relation to the wind turbine tower and/or the hub/nacelle at said direct or indirect connection to the nacelle. Hereby it is possible to have an initial safety distance between the attached rotor means and corresponding hub flange and nacelle. Subsequently the connection between the two may be established by vertically adjusting the position of the rotor means in the attachment means. The adjustment may be performed until the mutual distance is diminished or removed and a bolt connection can be established e.g. from the hub with remote control of the rotor means adjustment.

In another aspect of the invention, said wind turbine rotor means is one or more of the rotor blades. Hereby it is ensured that one or more of the rotor blades are securely transported and securely installed at the site of installation and that the time and costs of installation is minimized.

In an even further aspect of the invention, said attachment means is detached from said at least a part of the wind turbine rotor means and/or said wind turbine tower subsequent to said direct or indirect connection to the nacelle. Hereby it is possible to remove the attachment means when the wind turbine is put into service and thus reuse the attachment means in establishing other wind turbines.

In an aspect of the invention, said nacelle is elevated with the remaining part(s) of the wind turbine rotor means directly or indirectly attached e.g. in a "bunny ear" configuration. Hereby it is possible to erect the wind turbine with a reduced number of lift actions such as one action involving erection of the tower with one wind turbine blade attached followed by another action involving the elevation of the nacelle e.g. with two blades pre-mounted in the "bunny ear" configuration i.e. with no lifts of wind turbine blades alone.

In an even further aspect of the invention, said wind turbine is established at an offshore site. Hereby it is ensured that transporting and installation of wind turbine components at an offshore site is performed in a cost and time effective way.

The invention further relates to transport of a wind turbine tower wherein at least a part of the wind turbine rotor means is attached such as at least one wind turbine rotor blade. Hereby it is ensured that the tower and wind turbine rotor or at least a part or it is transported attached and thereby ready for installation at the installation site, without further attachment procedures necessary.

The invention also relates to a wind turbine tower comprising attachment means for attaching at least a part of the wind turbine rotor means. Hereby it is possible to establish a wind turbine in a simplified manner by the tower being erected with attached rotor means. In this aspect of the invention, the wind turbine tower is not arranged at the site but is ready to be transported to the site, preferably positioned in a vertical orientation.

In an aspect of the invention, said at least a part of the wind turbine rotor means is attached in the performance of a method for establishing a wind turbine at a site according to that described above. Hereby is an advantageous embodiment of the invention achieved by the use of the method for establishing a wind turbine.

In an aspect of the invention, said attachment means comprises one attachment element between the tower and the root flange of said wind turbine rotor means. Hereby it is possible to establish a firm connection between the tower and the wind turbine blade in the flange prepared for transferring wind energy under normal use to the hub.

In an aspect of the invention, said attachment means comprises a further attachment element between the tower and said wind turbine rotor means. By using a further attachment element it is ensured that the blade is kept stable along the tower surface during transport, erection of the tower and subsequent mounting of the blade to the hub. The number of further attachment elements may also be more than one, if necessary.

In an aspect of the invention, said further attachment element encircles a surface section of said wind turbine rotor means and with one or more attachment points on the tower. Hereby is established a flexible attachment element which may firmly grip the wind turbine blade or more loosely hold the blade in place while fixated at the root flange by the first attachment element.

In an aspect of the invention, said attachment points on the tower are established with magnetic means such as electromagnets. Hereby it is easy to attach, detach and reattach the attachment element on the tower by controlling the electric power supply e.g. in adjusting the position of the wind turbine blade. In another aspect of the present invention, the attachment means are permanently fastened to the tower and are kept after erection of the tower at the site to be used at a possible later removal of the rotor or the nacelle with the rotor attached thereto, e.g. for maintenance or repair, so that one or possible two of the blades may be fastened to the tower and the remaining part of the rotor may be removed, possibly together with the nacelle.

In other aspects of the invention, said attachment means comprises adjustment means for adjusting said at least a part of the wind turbine rotor means in relation to the tower or the tower and a hub/nacelle. Hereby is achieved a higher flexibility and simplicity in the attachment during and after the establishment of the wind turbine.

In an aspect of the invention, said attachment means are prepared for holding one wind turbine blade of said rotor means e.g. in a substantially vertical position and in proximity of the nacelle use position. Hereby is an advantageous embodiment of the invention achieved with the wind turbine blade and the tower forming a compact unit at the transportation and establishing of the wind turbine.

In another aspect of the invention, said attachment means are prepared for holding two or more wind turbine blades of said rotor means e.g. in a substantially horizontal position in proximity of the nacelle use position. Hereby it is possible to attach a complete rotor to the tower ensuring that only the nacelle/hub needs to be elevated at the site beside the tower with the attached rotor e.g. having two or three blades.

The invention further relates to use of a method according to that described above for erecting a wind turbine at an offshore site. The establishing of offshore wind turbines and wind farms involves further crane challenges in the often harsh environment as well as use of much specialised cranes. Consequently, the use of the invention at offshore locations is particularly advantageous even though the invention may just as well be used in establishing land based wind turbines.

Even further the invention relates to a vessel having one or more wind turbine towers arranged thereon for transport of the towers, where each wind turbine tower has at least a part of the wind turbine rotor means attached thereto. The towers are preferably arranged in a vertical position.

FIGURES

The invention will be described in the following with reference to the figures in which.

DETAILED DESCRIPTION

Figure 1:
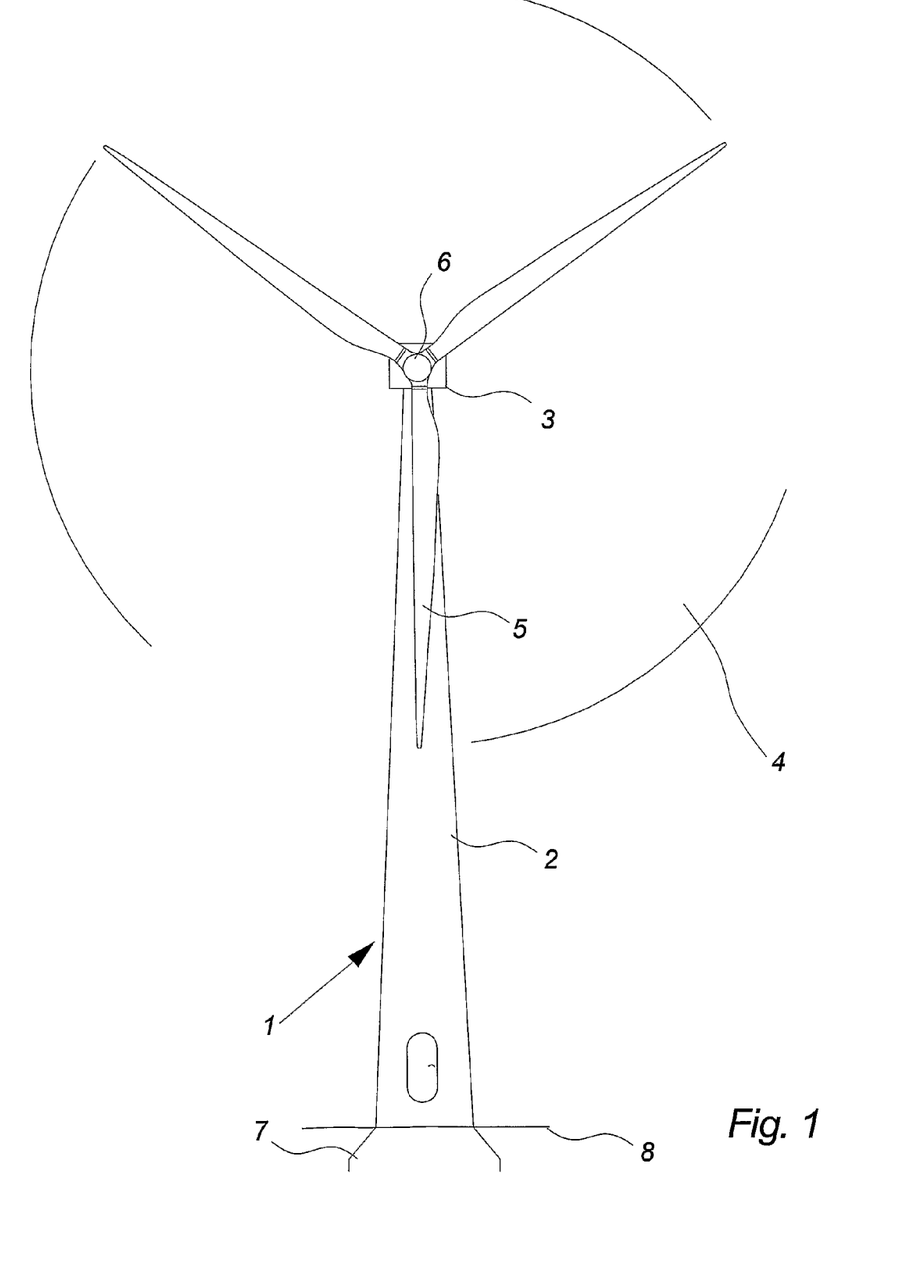
FIG. 1 illustrates a large modern wind turbine.

FIG. 1 illustrates a wind turbine 1, comprising a wind turbine tower 2 and a wind turbine nacelle 3 positioned on top of the tower 2. The wind turbine rotor 4 comprises at least one wind turbine blade e.g. three wind turbine blades 5 as illustrated in the figure. The rotor is mounted on a hub 6, which is connected to the nacelle 3 through the low speed shaft extending out of the nacelle front.

The wind turbine tower 2 is erected on a foundation 7 either at ground level or at sea level 8 defined by the wind turbine being of an onshore or an offshore type.

FIGS. 2 to 5 illustrate schematically steps of erecting of an offshore wind turbine with a method according to the invention.

Figure 2:
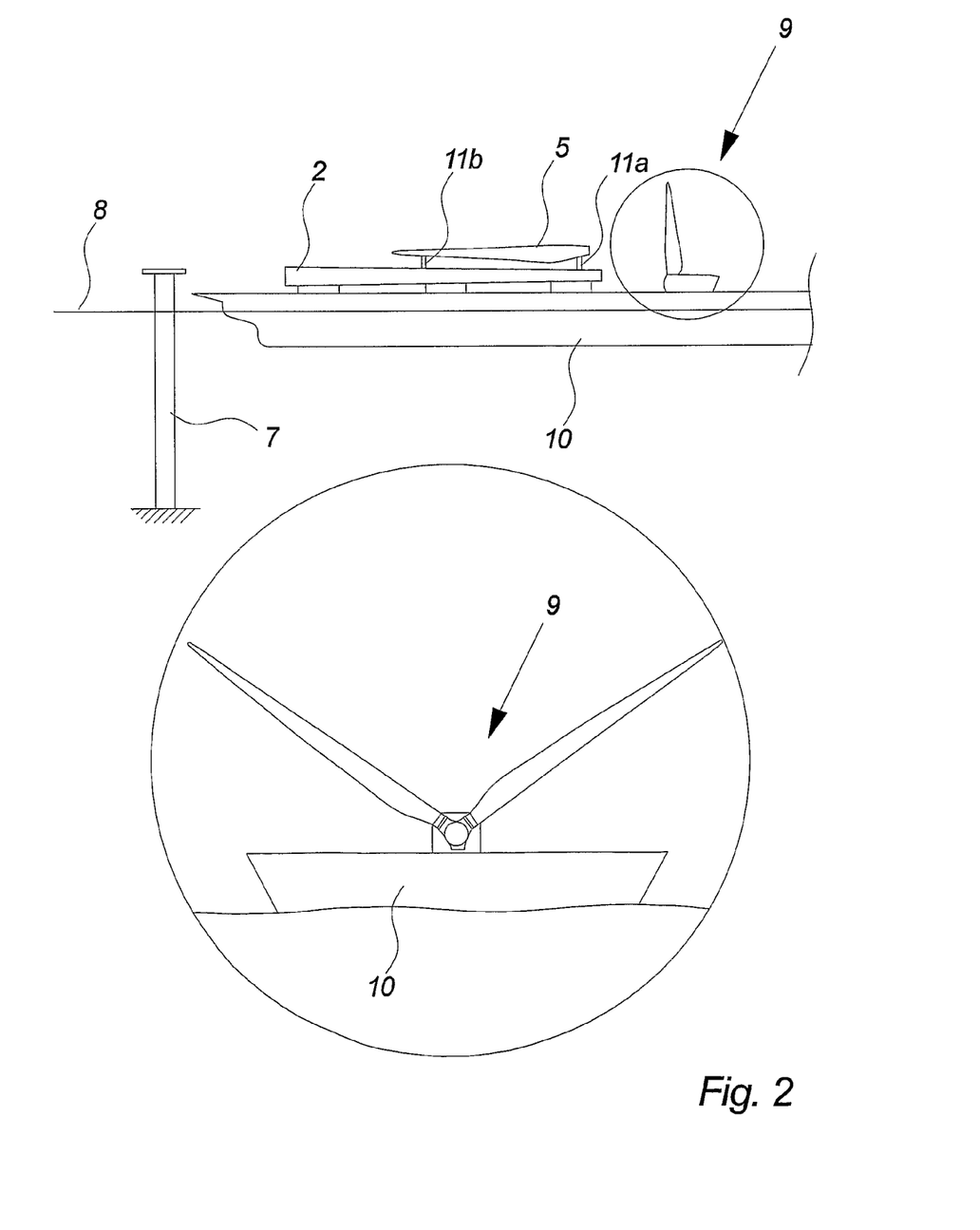
FIGS. 2 to 5 illustrate schematically steps of erecting of an offshore wind turbine with a method according to the invention.

FIG. 2 illustrates the initial step of transporting the wind turbine to the offshore site on the deck of a jack-up ship or barge 10.

The wind turbine is disassembled and transported in sections including the complete wind turbine tower 2 and a unit 9 comprising the nacelle and hub with two wind turbine blades fitted in a "bunny ear" configuration i.e. two of three blades is mounted on the hub and pointing up in relation to a horizontal plane during the transportation.

Prior to installation of the tower, the 3rd blade is fitted to the tower in the exact position related to the nacelle. In order to attach the blade to the tower, attachment means are fitted to the tower e.g. attachment means comprising attachment elements 11 $a$, 11$b$ at the blade root and tip (as illustrated in the figure).

It should be emphasized though that more than one blade such as two or three can be fitted to the tower prior to installation. For various embodiments of the invention, the configuration of the nacelle and hub also transported may alter i.e. if three blades are fitted to the tower, the nacelle and hub may be transported without any mounted rotor blades to it.

The foundation 7 for the offshore wind turbine to be established is illustrated in relation to the seabed and the sea level 8.

The enlarged part of the figure further illustrates the unit 9 positioned on the deck of the barge 10 i.e. the unit including a nacelle and hub with two wind turbine blades fitted in a "bunny ear" configuration.

Figure 3:
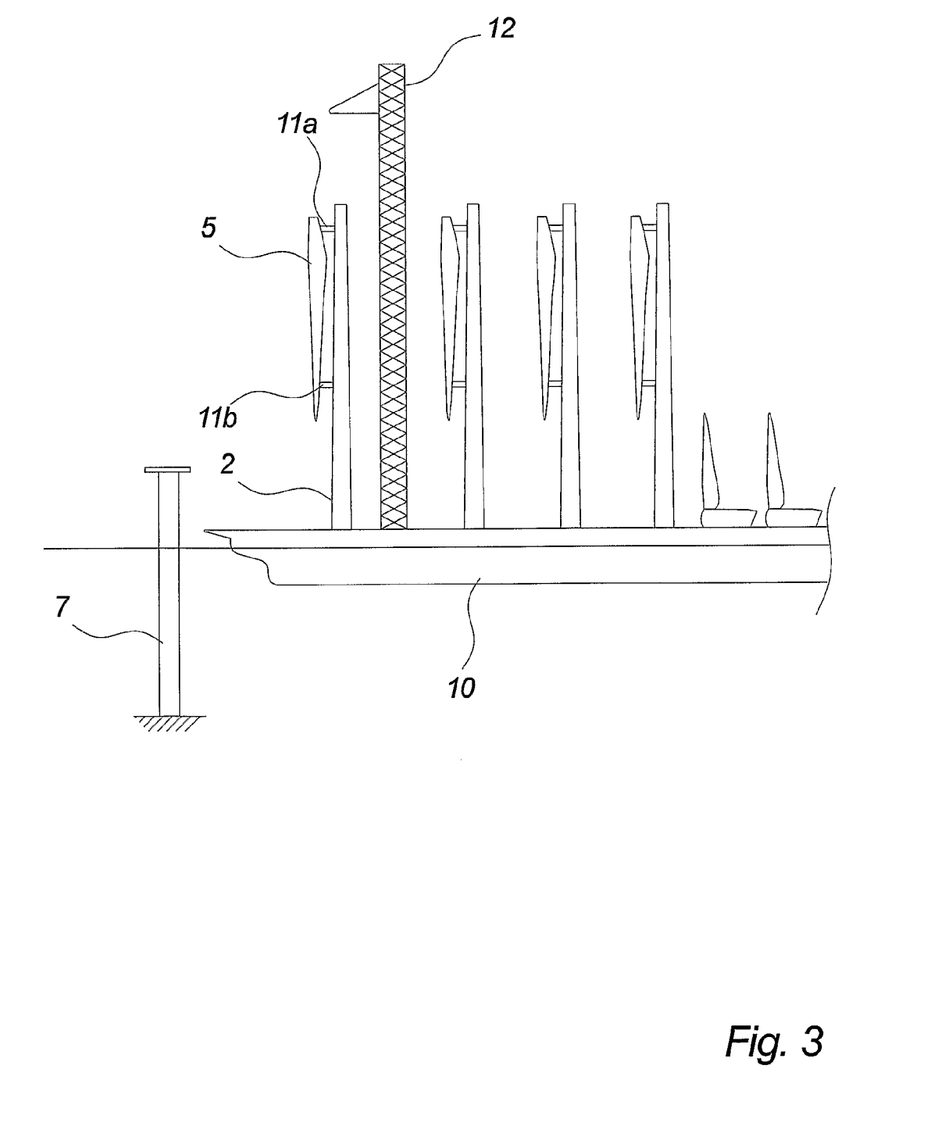

FIG. 3 illustrates schematically for various embodiments of the invention, how the tower with the fitted blade can be transported in a substantially vertical position. Furthermore more than one wind turbine can be transported at the same time.

It is also illustrated that similar to transporting more that one tower, it is also possible to transport more than one units 9 comprising the nacelle and hub as previously described.

Figure 4:
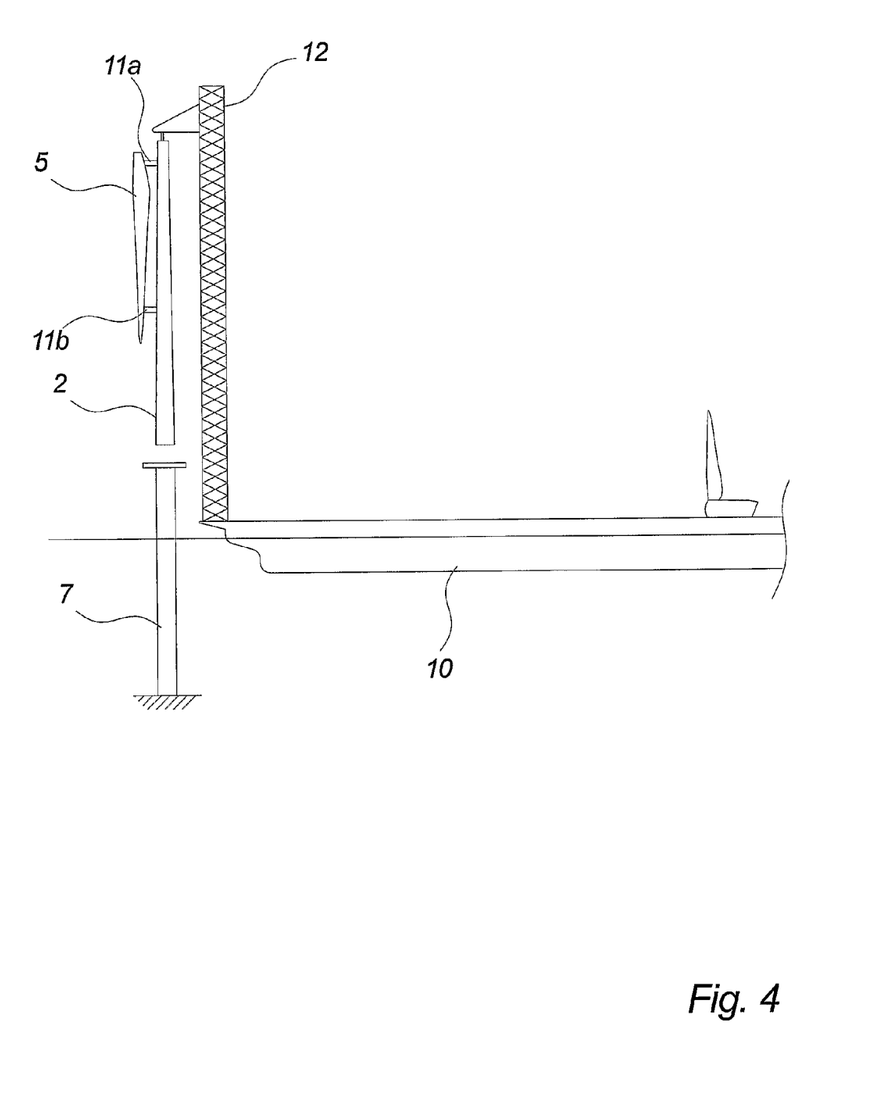

FIG. 4 illustrates the positioning of the wind turbine tower 2 with the aid of a crane 12 lifting the tower in place on the foundation 7. The tower 2 is illustrated with the attached $3^{rd}$ blade 5 which hangs substantially vertical on the side of the tower in the attachment elements 11$a$, 11$b$ of the attachment means.

In another embodiment of the invention, the tower has the foundation attached prior to the arrival on the site. The tower may hereafter be positioned together with the 3$^{rd}$ wind turbine blade and the foundation as one item on the site by the crane.

Figure 5:
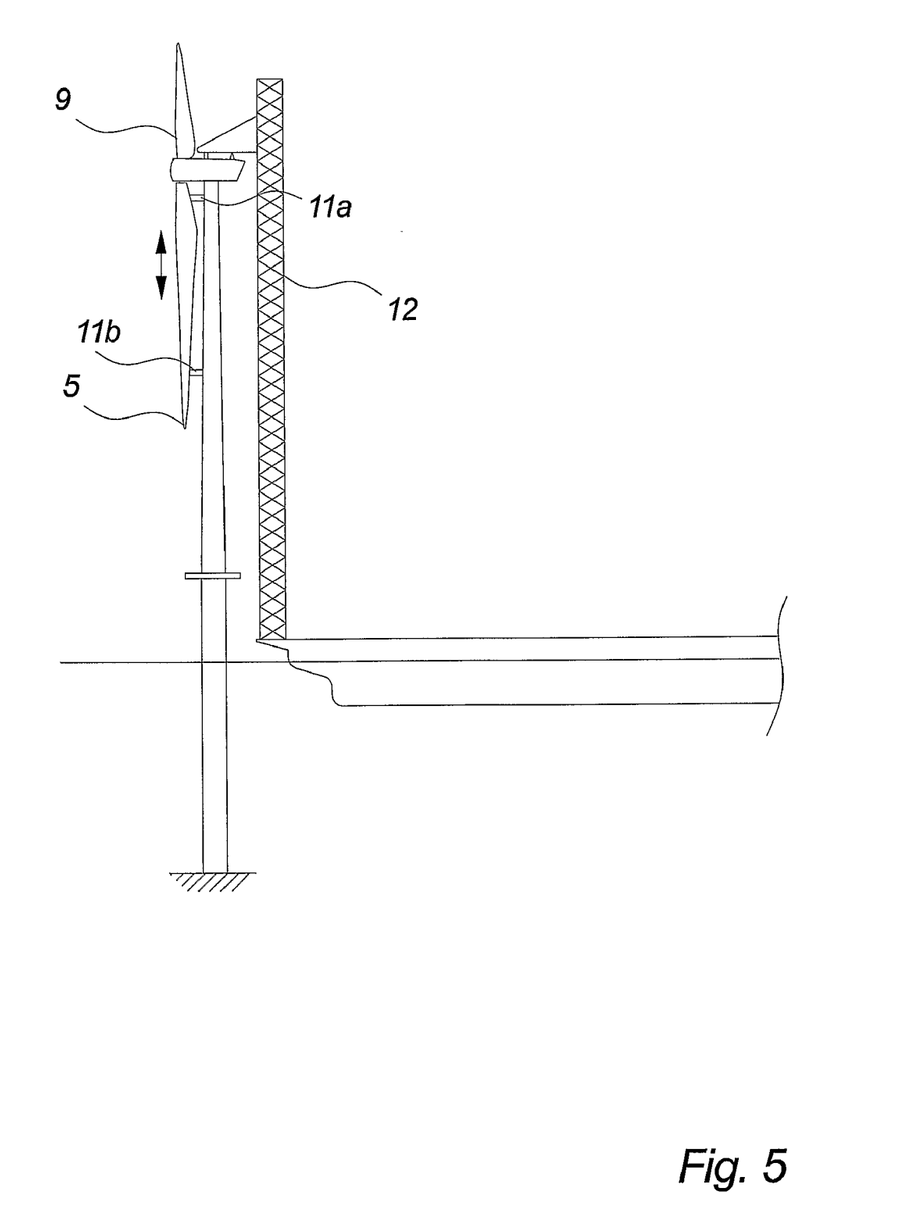

FIG. 5 illustrates the nacelle/hub 9 in the "bunny ear" configuration being elevated to the top of the tower and positioned in a use position onto the tower by the crane 12.

Once the nacelle 3 and hub 6 is lowered onto the tower 2, the interface surfaces of the 3$^{rd}$ blade 5 and the blade flange in the hub may in the embodiment be located correctly in relation to each other to allow that the blade is bolted to the hub.

However, the 3$^{rd}$ blade 5 may also be fitted in adjustable attachment elements 11a, 11b of the attachment means allowing the blade to be adjusted to the correct position in relation to the hub. Once the blade has been bolted to the hub, the attachment elements 11a, 11b are released and lowered to the foundation access platform for reuse on the establishing of another wind turbine.

Figure 6:
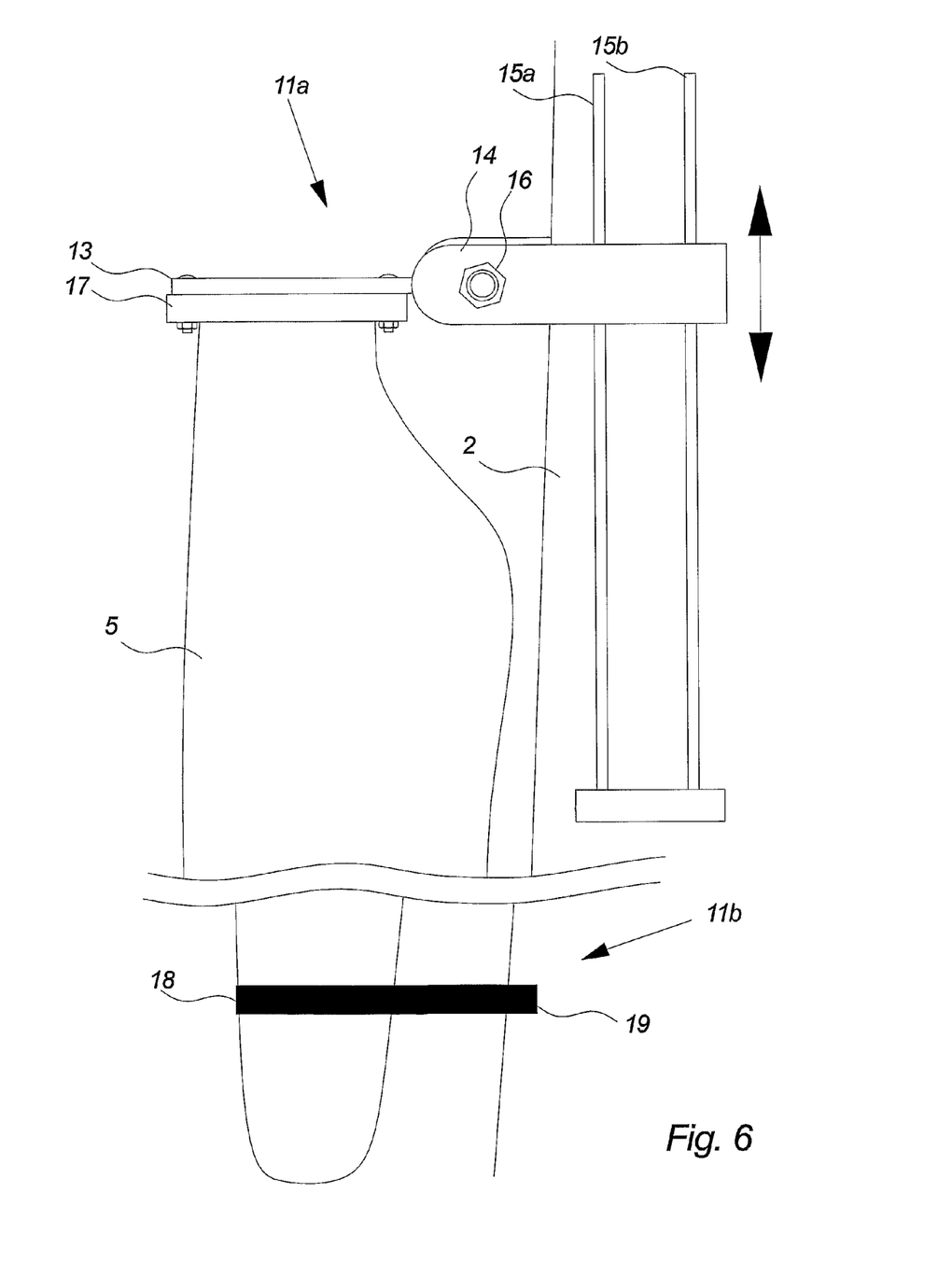
FIG. 6 illustrates schematically an embodiment of attachment means for a wind turbine tower according to the invention.

FIG. 6 illustrates schematically an embodiment of an adjustable and detachable attachment means comprising two attachment elements 11a, 11b for attaching a wind turbine blade 5 to a wind turbine tower 2.

The attachment element 11a comprises means for gripping a flange plate 13 e.g. gripping arms 14 engaging the plate from opposite sides. The flange plate is attached to the wind turbine blade at the blade flange 17 with a number of bolt connections.

The attachment element 11a including the flange plate 13 holds the wind turbine blade in the vertical position along the tower side during the establishing of the wind turbine at the site. The flange plate may be removed by removing the bolt connections when the flanges of hub and the 3$^{rd}$ blade have been connected by a few bolts.

The means for controlling the engagement and subsequent detachment of the attachment element from the tower is schematically illustrated as a bolt-nut connection 16 i.e. a connection which may be tightened or loosened.

Further, the tower side is schematically illustrated with two parallel rails 15a, 15b which may be used in the adjustment and guidance of the wind turbine blade 5 via the attachment means 11a, 11b e.g. forced vertically up or down with the aid of power drive means (not illustrated).

The further attachment means 11b is illustrated as a band 18 encircling a surface section or part of the wind turbine blade 5 and connected to the tower 2 in one or more attachment point 19 e.g. two attachment points on opposite side of the tower.

The band may encircle the blade section fully (360°+) or just the blade sides and the front edge as (as illustrated).

The end(s) of the band may in one embodiment comprise magnetic connection means such as electromagnets allowing the band to establish firm connection to the steel tower.

The attachment elements may be constructed in number of other ways e.g. with bolts penetrating the wind turbine blade or plates welded to the tower side.

Figure 7:
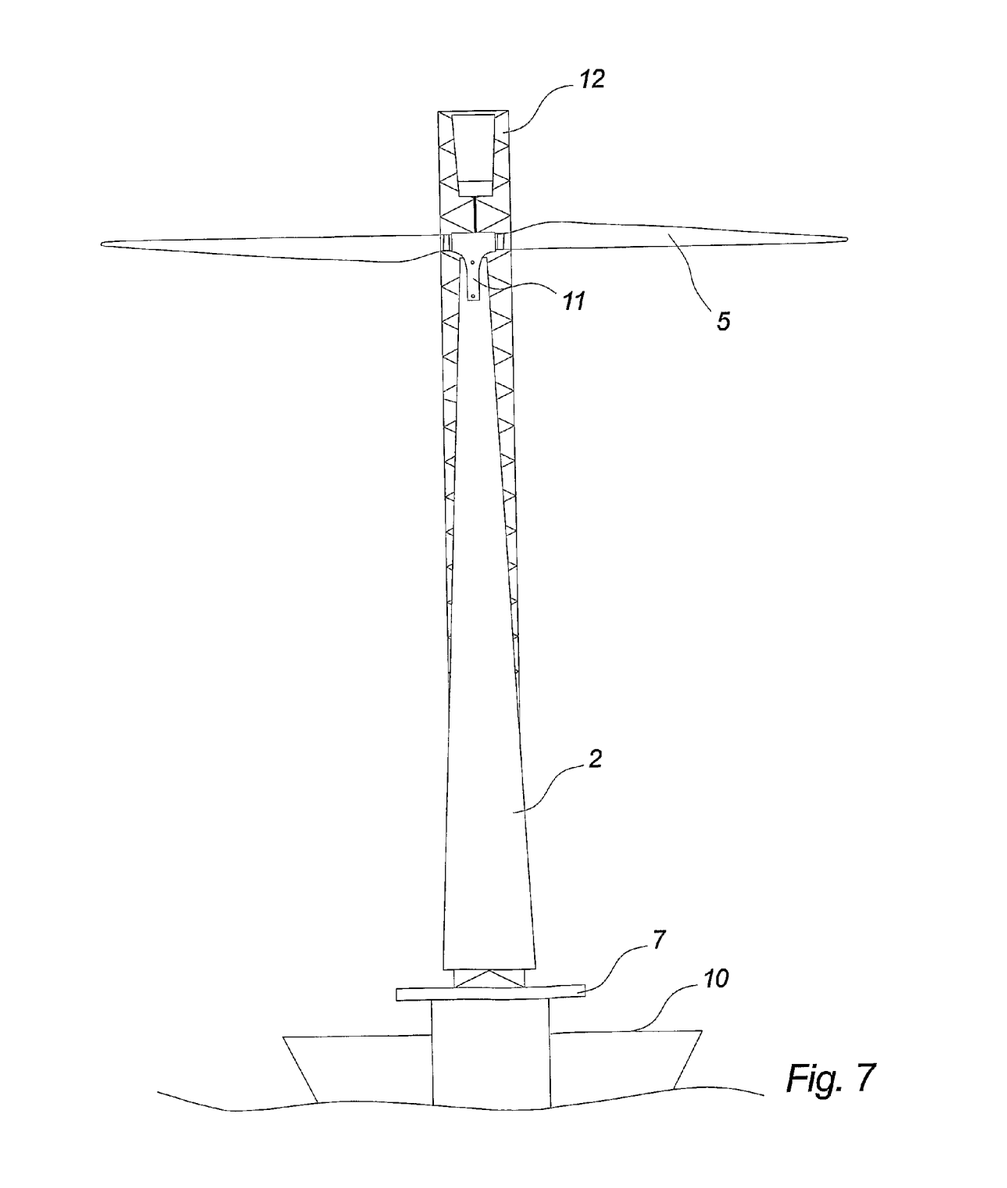
FIG. 7 illustrates another embodiment of the attachment means for a wind turbine tower according to the invention.

FIG. 7 illustrates another embodiment of a wind turbine tower 2 according to the invention being positioned on a foundation 7 by a crane 12 in the establishing of a wind turbine.

The embodiment is illustrated with the wind turbine blades 5 of a two-bladed rotor attached at the root flanges to one common attachment means 11. The single attachment means is also attached to the upper part of the wind turbine tower with connection means such as a number of bolts.

The nacelle and hub of the wind turbine are elevated to the use position on top of the tower after the tower has been attached to the foundation and the two-bladed rotor is connected to the hub. The attachment means is subsequently removed from the blades and tower.

LIST

1. Wind turbine
2. Wind turbine tower
3. Wind turbine nacelle
4. Wind turbine rotor
5. Wind turbine blade
6. Wind turbine hub
7. Wind turbine foundation
8. Ground or sea level
9. Unit of a nacelle/hub and two blades in a "bunny ear" configuration
10. Jack-up ship for offshore wind turbines
11. Attachment means for attaching a wind turbine blade to the tower with one or more attachment elements
11a. Attachment element
11b. Further attachment element
11. Ship crane or an individual and separate crane
13. Flange plate of an attachment element
14. Gripping arms for the flange plate
15a, 15b. Tower rails for guiding the attachment means
16. Detachment means
17. Wind turbine blade flange for subsequent connection to the corresponding hub flange
18. Band of a further attachment element encircling a surface section of the wind turbine blade
19. Attachment point

The invention claimed is:

1. A method for establishing a wind turbine on a site, comprising:
    attaching at least one blade to a wind turbine tower by attachment means prior to installation of the wind turbine on the site,
    positioning the wind turbine tower in position for use at the site with the at least one blade attached thereto but without a wind turbine nacelle thereon,
    elevating a wind turbine nacelle to a use position on the wind turbine tower, and
    directly or indirectly connecting the nacelle to the at least one blade.

2. The method according to claim 1 where the wind turbine tower is positioned with a foundation attached.

3. The method according to claim 1 where the wind turbine tower is positioned on a foundation pre-established at the site.

4. The method according to claim 1 where the at least one blade is a single blade and the nacelle is elevated with two out of three blades attached to a rotor hub on the nacelle.

5. The method according to claim 1, where the wind turbine is established at an offshore site.

6. The method of claim 1, wherein the attachment means carries substantially the entire weight of the at least one blade.

7. A method for establishing a wind turbine on a site, comprising:
    attaching at least one blade to a wind turbine tower by attachment means prior to installation of the wind turbine on the site,
    positioning the wind turbine tower in position for use at the site with the at least one blade attached thereto,
    elevating a wind turbine nacelle to a use position on the wind turbine tower, and
    directly or indirectly connecting the nacelle to the at least one blade, further comprising the step of detaching the attachment means from the at least one blade and the wind turbine tower subsequent to connecting to the nacelle.

8. A method for establishing a wind turbine on a site, comprising:

attaching at least one blade to a wind turbine tower by attachment means prior to installation of the wind turbine on the site, positioning the wind turbine tower in position for use at the site with the at least one blade attached thereto, elevating a wind turbine nacelle to a use position on the wind turbine tower, and directly or indirectly connecting the nacelle to the at least one blade, wherein attaching the at least one blade to the wind turbine tower is done prior to directly or indirectly connecting the nacelle to the at least one blade.

* * * * *